BEST AVAILABLE COPY

P. LYTTLETON.
Live-Stock Register.

No. 198,307. Patented Dec. 18, 1877.

Witnesses
Ira L. Boone
Frank A. Brooks

Inventor
Patrick Lyttleton
by Dew

UNITED STATES PATENT OFFICE.

PATRICK LYTTLETON, OF AUSTIN, NEVADA.

IMPROVEMENT IN LIVE-STOCK REGISTERS.

Specification forming part of Letters Patent No. 198,307, dated December 18, 1877; application filed October 4, 1877.

*To all whom it may concern:*

Be it known that I, PATRICK LYTTLETON, of Austin, county of Lander, and State of Nevada, have invented an Improved Stock-Counter; and I do hereby declare the following to be a full, clear, and exact description thereof, reference being had to the accompanying drawings.

My invention relates to a novel device for counting live stock; and it consists in a gate or door so connected with a registering-wheel that each and every animal, in passing through the gate, will be counted and the count recorded on a dial, which receives the count from the wheel, of which the following is a description, reference being had to the accompanying drawings, in which—

Figure 1:
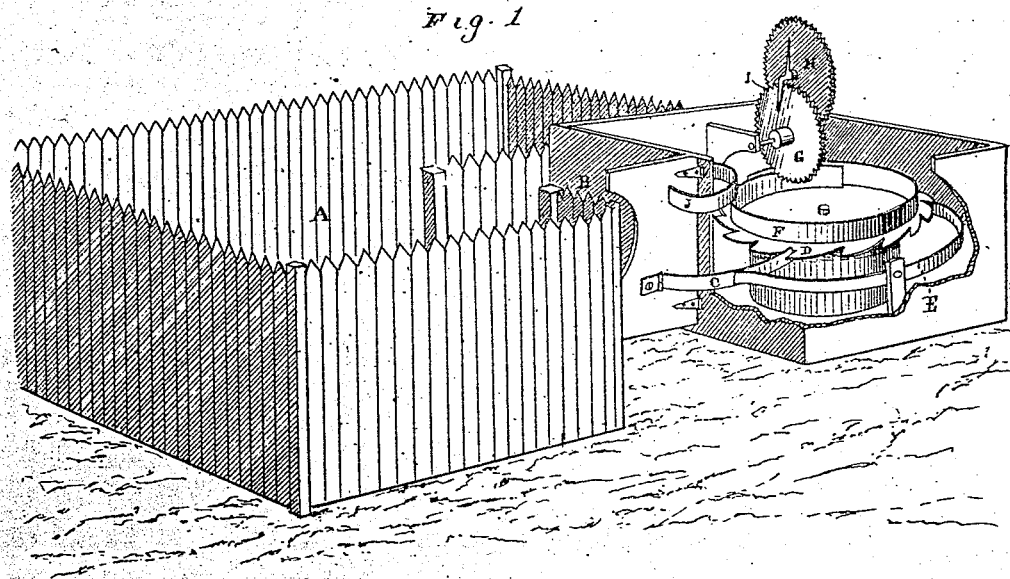
Figure 2:
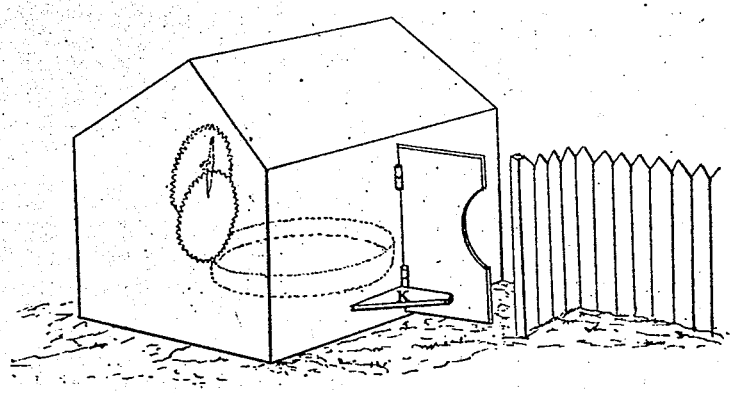

Figure 1 is a perspective view. Fig. 2 represents a housing for the counting mechanism.

Let A represent a yard or inclosure in which the stock to be counted are confined, and B the gate or door through which each animal must pass in order to be counted. This gate partially fills an opening which is just wide enough to allow the class of animals being counted to pass through, so that each animal, in passing through the gate, will open it to its full width, and each and every time the gate is thus opened by an animal passing through it will be registered, as hereinafter described.

On the outside of the gate a pawl, C, is hinged, which engages with a horizontal circular ratchet, D, fixed at one side of the gate. A detent, E, in front of the ratchet D prevents the ratchet from turning more than one tooth each time the gate is opened, and also serves as a spring, forcing the pawl constantly against the ratchet.

The ratchet can be constructed with any number of teeth, each of which is numbered, and tallies one for each animal that passes through the gate.

A circular rim, F, projects from the top of the ratchet-wheel and plays into a train of gears, G H, as shown. This rim is lapped at its meeting ends, the forward advancing end being on the outside, with a space between the lap of the two ends, to allow of one tooth in the lower wheel G of the train being always between them. The thickness of this rim is such as to allow it to pass between the teeth of the lower train-wheel, so that as the ratchet D is turned this rim, acting between the teeth of the wheel, moves it along one tooth with each revolution of the ratchet.

The train of gears can be made with any number of wheels; but in the present instance I have shown but two, that number being sufficient for all ordinary uses.

A double-ended pointer, I, is attached to the upper wheel H, and the teeth of each wheel are numbered, so that with the pointer the record of the gate can be seen at a glance.

It will be obvious that each tooth on the lower wheel will register one revolution of the ratchet, and that every revolution of the wheel G will be shown by the upper wheel H and pointer I, which serve as dials to register the count.

A spring, J, attached as shown, throws the gate open as each animal passes through, and a stop, K, prevents the gate from swinging too far back.

My invention can be housed, as shown, to protect and give points of attachment for the different parts; or it can be covered, and the parts held together by any suitable arrangement.

The form and size of the gate can also be varied, as the different varieties of stock which are to be counted may require.

By my invention large herds of cattle, sheep, &c., can be quickly and accurately counted, with little or no labor or time from the herdsman or the person in charge, as the counter needs no attention, and when the count is completed the tally will remain, showing upon the dials until the counter is in operation again.

The same arrangement for registering a count can be used for various other purposes.

Having thus described my invention, what I claim, and desire to secure by Letters Patent, is—

1. A stock-counter consisting of a gate, B, ratchet D, and registering-gear train G H, with the pawl C, spring-detent E, and the circular rim F, all combined and operated substantially as herein described.

2. The ratchet D, with its pawl C, spring-detent E, and circular overlapping rim F, in combination with the registering-gears G H and pointer I, all constructed substantially as herein described.

3. The gate B, with its spring J, stop K, and pawl C, in combination with the ratchet D, spring-detent E, circular rim F, and registering-gear train G H, all constructed, combined, and operated substantially as herein described.

In witness whereof I have hereunto set my hand and seal.

PATRICK LYTTLETON. [L. S.]

Witnesses:
GEORGE F. DINSMORE,
WILLIAM A. CLIFFORD.